Sept. 8, 1925.
A. BARR ET AL
1,553,211
ATTACHMENT FOR VARYING THE MAGNIFYING POWER OF TELESCOPES
Filed Aug. 26, 1921
FIG: 1.
FIG: 2.
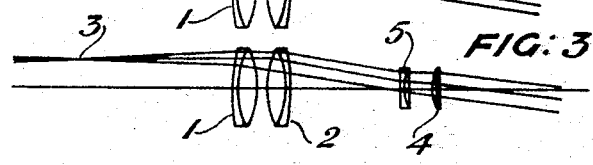
FIG: 3.
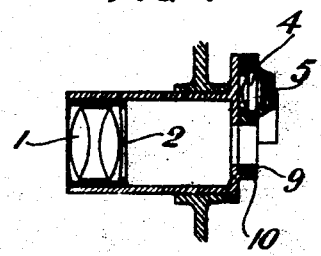
FIG. 7.
FIG: 4.
FIG: 5.
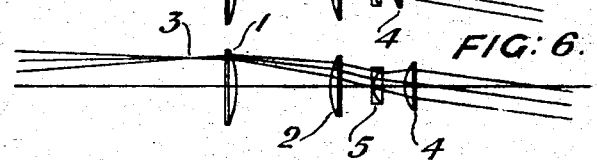
FIG: 6.
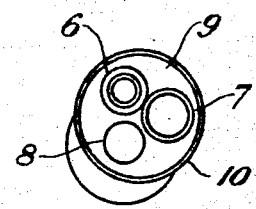
FIG: 8.
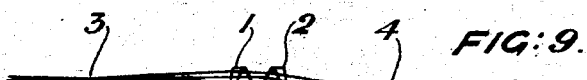
FIG: 9.
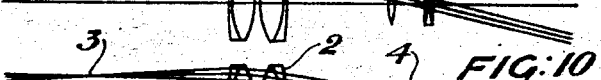
FIG: 10.
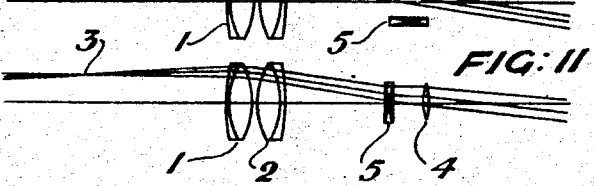
FIG: 11.
Inventors.
Archibald Barr
William Stroud,
By J. Walter Fowler
Attorney Patented Sept. 8, 1925.

1,553,211

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

ATTACHMENT FOR VARYING THE MAGNIFYING POWER OF TELESCOPES.

Application filed August 26, 1921. Serial No. 495,551.

(GRANTED UNDER THE PROVISIONS OF THE ACT OF MARCH 3, 1921, 41 STAT. L., 1313.)

*To all whom it may concern:*

Be it known that we, ARCHIBALD BARR and WILLIAM STROUD, subjects of the King of Great Britain and Ireland, and both of 5 Caxton Street, Anniesland, Glasgow, Scotland, have invented new and useful Improvements in Attachments for Varying the Magnifying Power of Telescopes (patented in Great Britain, No. 128,674, upon an application dated September 1, 1917), of which the following is a specification.

The object of our invention is to provide an attachment exterior to the eyepiece of a telescope or telescopic instrument (e. g., a rangefinder) to be referred to in the claims generally as a primary telescope of such a nature that the magnifying power may be altered without in any way altering the focal plane of the primary telescope and without materially shifting the position of the exit pupil.

An attachment according to this invention comprises a short Galilean telescope (i. e., a convergent lens of focal length F and a stronger divergent lens of focal length $f$ separated approximately by a distance F—$f$) or the attachment may comprise more than one short Galilean telescope, which or each of which may be inserted exterior to the primary telescope between the eye and the ordinary eyepiece of the telescopic instrument when required. One short Galilean telescope may be used to produce magnification only or diminution only, or it may be used to produce either magnification or diminution by its being inserted in one or other of two attitudes (1) with the divergent lens nearer the eye in which case an increase of magnifying power will be produced (2) with the convergent lens nearer the eye in which case there will be produced a corresponding decrease in magnifying power. Thus with an attachment having one short Galilean telescope, two or three magnifying powers will be available. In the first case (1) without the Galilean telescope and (2) with the Galilean telescope in use. In the second case (1) without the Galilean telescope (2) with the Galilean telescope in one attitude (3) with the Galilean telescope reversed.

Further variation of magnifying power may be obtained by using a number of short Galilean telescopes. For example, these may be mounted capable of being moved so that any one may be brought into the proper position between the eye and the eyepiece.

In carrying out our invention it is desirable that the primary telescope to which the attachment is to be fitted should be provided with an eyepiece the constituent lenses of which are in close proximity so as to leave the maximum possible distance between the eyepiece and the exit pupil, in order to have room for the introduction of the attachment.

Several advantages are associated with this method of producing variable magnifying power, e. g., (*a*) The attachment can be added to any existing telescope provided the eyepiece is suitable for the purpose.

(*b*) If the telescope has been made watertight or dust-tight the addition of the attachment does not introduce any source of leakage.

(*c*) If the telescope has a graticule, line or other mark upon which the eyepiece is focussed the introduction of the attachment does not affect this focus.

We are aware that attachments of the Galilean type have been used for a similar purpose before, the attachment being inserted exterior to the objective, or inserted in the body of the telescope. In such cases the aperture of the Galilean telescope must be made very much larger than is necessary when (in accordance with the present invention) the Galilean telescope is inserted on the eye side of the eyepiece. Galilean telescopes have also been placed before in series with one another so that the resulting magnification may be the product of the magnification of the two telescopes, but in all such cases with which we are acquainted the eye point (or exit pupil) has undergone material change in position. So far as we are aware, a short Galilean telescope has not previously been used as an attachment for producing variable magnification by being inserted exterior to the telescope at a position between the eye lens of the eyepiece and the eye point (or exit pupil) of the primary telescope without notable displacement of the said eye point.

Some examples according to this invention will now be described with reference to the accompanying drawings, in which:—

Figures 1 to 3 refer to a case where the eyepiece consists of two achromatic lenses in proximity. Figures 4, 5 and 6 refer to a case of an eyepiece of the Ramsden type. Figure 7 represents a section and Figure 8 an end view of a construction permitting of the introduction at will of either of two Galilean (or kindred) systems one of which is shown in section in Figure 7.

Figures 9, 10 and 11 refer to another method of introducing or removing the Galilean system.

In all the Figures 1 to 6 and 9 to 11 the eye point is on the right-hand side.

In Figures 1, 2 and 3, which represent three conditions of the same eyepiece, the ordinary eyepiece is represented by the two achromatic lenses 1 and 2 in close proximity (common practice in cases where it is desired to have an eyepoint at some distance from the eyepiece). The rays of light represented correspond to those coming through the objective (not shown) from a point of the object not on the axis of the telescopic system. These rays after converging to the image point 3 diverge and after traversing the eyepiece 1, 2 emerge as a parallel (or nearly parallel) beam in a condition to be in focus when they fall upon a normal eye placed at the eyepoint. Figure 2 represents the ordinary case without the Galilean attachment. Figure 1 shows an attachment inserted in such a manner as to increase the magnification while Figure 3 shows an attachment to produce a diminution in the magnification. Each of these attachments which embodies the principal feature of the present invention is in all the cases shown represented by the lenses 4 and 5 of which 4 is a convergent lens of focal length, say, F, and 5 is a divergent lens of focal length $f$ in which case the distance between 4 and 5 will be $F-f$. In the case of 4 (Figure 1) it will be desirable to make 4 an achromatic combination, but in the case of 4 (Figures 3, 5 and 6, where the magnification is less than 1) it is frequently possible to use a simple lens.

In Figures 4, 5 and 6, Figure 4 corresponds to the case of an ordinary Ramsden eyepiece without any attachment, while Figure 5 and Figure 6 correspond to two cases in each of which the attachment produces a magnification which is less than 1 in Figure 5 and much less than 1 in Figure 6. In the case of a Ramsden eyepiece it is generally impossible to use the attachment 4, 5 in the manner of Figure 1 so as to produce a magnification greater than 1 without producing a badly positioned eye point.

In the first eyepiece represented in Figures 1, 2 and 3, the medium power is obtained by the eyepiece 1, 2 itself. The low power is obtained by inserting the minifying Galilean combination 5, 4, and the high power by inserting a magnifying Galilean combination 4, 5.

In Figures 7 and 8, two Galilean attachments 6 and 7 are mounted and a clear aperture 8 is provided, as shown, upon a ring 9 which can be turned inside the ring 10 so that either 6, 7 or 8 may be brought into the axis of the system.

In Figures 9 to 11 there is shown a further method of manipulating the Galilean system in and out or reversing it. In this case the system 4, 5 is arranged so as to be rotatable at will about an axis perpendicular to the paper midway between the two lenses. In Figure 9 is shown the high power; after rotation of the system through 90° the system is optically removed as indicated in Figure 10, while after a further rotation through 90°, as indicated in Figure 11, the lowest power is obtained.

We claim:—

1. An attachment to a primary telescope at the eyepiece end thereof and exterior to the telescope at a position between the eye lens of the eyepiece and the eyepoint comprising a short Galilean telescope consisting of a convergent lens and a stronger divergent lens separated by a distance approximately equal to the difference in the focal length of the lenses, for the purposes set forth.

2. An attachment to a primary telescope at the eyepiece end thereof and exterior to the telescope at a position between the eye lens of the eyepiece and the eye point comprising a short Galilean telescope consisting of a convergent lens and a stronger divergent lens separated by a distance approximately equal to the difference in the focal length of the lenses, the attitude of the Galilean telescope being such that the convergent lens is nearer the eye, for the purposes set forth.

3. An attachment to a primary telescope at the eyepiece end thereof and exterior to the telescope at a position between the eye lens of the eyepiece and the eye point comprising two short Galilean telescopes, each consisting of a convergent lens and a stronger divergent lens separated by a distance approximately equal to the difference in the focal length of the lenses, for the purposes set forth.

4. An attachment to a primary telescope at the eyepiece end thereof and exterior to the telescope at a position between the eye lens of the eyepiece and the eye point comprising a number of short Galilean telescopes, each consisting of a convergent lens and a stronger divergent lens separated by a distance approximately equal to the difference in the focal length of the lenses, and mounted capable of being moved, for the purposes set forth.

5. An attachment to a primary telescope at the eyepiece end thereof and exterior to the telescope, a carrier mounted on the attachment capable of movement about a centre eccentric to the axis of the eyepiece of the primary telescope, a short Galilean telescope, consisting of a convergent lens and a stronger divergent lens separated by a distance approximately equal to the difference in the focal length of the lenses, mounted on the carrier, for the purposes set forth.

6. An attachment to a primary telescope at the eyepiece end thereof and exterior to the telescope, a carrier mounted on the attachment capable of movement about a centre eccentric to the axis of the eyepiece of the primary telescope, a number of short Galilean telescopes, each consisting of a convergent lens and a stronger divergent lens separated by a distance approximately equal to the difference in the focal length of the lenses, mounted on the carrier, for the purposes set forth.

ARCHIBALD BARR.
WILLIAM STROUD.